United States Patent
Cheng et al.

(10) Patent No.: US 7,290,886 B2
(45) Date of Patent: Nov. 6, 2007

(54) ILLUMINATING SYSTEM AND METHOD FOR IMPROVING ASYMMETRIC PROJECTION

(75) Inventors: Chu-Ming Cheng, Hsin-Chu (TW); Yi-Hao Kang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/065,714

(22) Filed: Nov. 13, 2002

(65) Prior Publication Data

US 2003/0090635 A1    May 15, 2003

(30) Foreign Application Priority Data

Nov. 15, 2001   (TW) .............................. 90128276 A (51) Int. Cl.
- G03B 21/00 (2006.01)
- G03B 21/14 (2006.01)
- G03B 21/28 (2006.01)
- H04N 9/12 (2006.01)
- G02F 1/00 (2006.01)
- F21V 7/00 (2006.01)
- G02B 26/00 (2006.01)

(52) U.S. Cl. .......................... 353/70; 353/31; 353/81; 348/742; 348/771; 362/304; 359/292

(58) Field of Classification Search .................. 353/31, 353/69–70, 98, 81; 348/742, 771; 313/113, 313/114; 362/304; 359/290–292
See application file for complete search history.

(56) References Cited

U.S. PATENT DOCUMENTS

| | | | | |
|---|---|---|---|---|
| 3,835,342 | A * | 9/1974 | Freeman ...................... | 313/114 |
| 5,442,414 | A * | 8/1995 | Janssen et al. ................ | 353/98 |
| 5,863,125 | A * | 1/1999 | Doany .......................... | 353/84 |
| 6,419,365 | B1 * | 7/2002 | Potekev et al. ............... | 353/98 |
| 6,517,210 | B2 * | 2/2003 | Peterson et al. .............. | 353/98 |
| 6,588,908 | B2 * | 7/2003 | Shimizu ....................... | 353/81 |
| 6,631,994 | B2 * | 10/2003 | Suzuki et al. ................. | 353/77 |
| 6,698,902 | B2 * | 3/2004 | Kawano et al. ............... | 353/99 |
| 6,719,429 | B2 * | 4/2004 | Peterson ...................... | 353/69 |
| 6,724,546 | B2 * | 4/2004 | Nishimae et al. ........... | 359/740 |
| 2002/0036833 | A1 * | 3/2002 | Miyata et al. .............. | 359/651 |
| 2005/0073659 | A1 * | 4/2005 | Sannohe et al. ............. | 353/56 |

* cited by examiner

Primary Examiner—W. B. Perkey
Assistant Examiner—Magda Cruz
(74) Attorney, Agent, or Firm—Troxell Law Office, PLLC (57) ABSTRACT

An illuminating system and method for improving asymmetric projection includes a light source producing a light beam to form a light path, a projection lens disposed in the light path, a light valve inserted in the light path between the light source and the projection lens, and at least one anamorphic surface unit placed in the light path between the light source and the light valve. The anamorphic surface unit offsets a distortion of a light spot resulted from obliquely incidence on the light valve, thus an asymmetric light spot can be improved as a more symmetric one to increase illuminating collection efficiency and uniformity.

15 Claims, 12 Drawing Sheets

| Oblique illumination system | | | |
|---|---|---|---|
| | Prior art | Invention | Boost |
| DMD effeciency(%) | 77.7 | 81.3 | 4.6 |
| Overfill(%) | 20.8 | 17.3 | 16.8 |
| Projection output on-state(%) | 70.0 | 72.0 | 2.9 |
| Projection output flat-state(%) | 0.13 | 0.04 | 69.2 |

ILLUMINATING SYSTEM AND METHOD FOR IMPROVING ASYMMETRIC PROJECTION

CROSS REFERENCE TO RELATED APPLICATION

This application incorporates by reference Taiwanese application Serial No. 90128276, filed on Nov. 15, 2001.

BACKGROUND OF THE INVENTION

1. Field of the Invention

The present invention relates to a projection system and, more particularly, to an illuminating system and method for improving asymmetric projection in a projection system.

2. Description of Related Art

Figure 1:
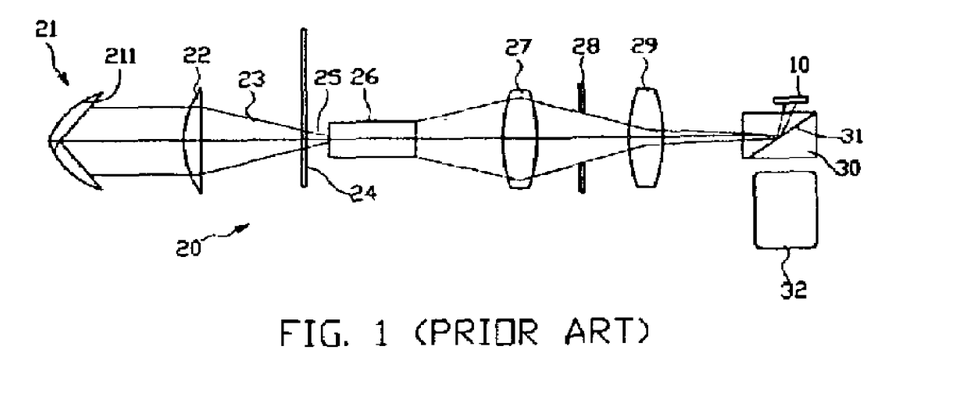
FIG. 1 is a schematic view showing a light path of a first projection system in the prior art.

Referring to FIG. 1, a projection system 20 in a prior art is a single panel full color system having a light source 21 with a parabolic concave reflector 211 to emit a white light beam 23. After reflected by the parabolic concave reflector 211, the white light beam 23 passes through a converging lens 22 to converge the light beam 23 on a color wheel 24. When rotating around a shaft, the color wheel 24 has a sequence of red, green, and blue filters to intercept the light beam 23 in order, so the light beam 23 shifts into a color light beam 25 as passing through the color wheel 24. Then, the color light beam 25 transmits in order through an integration rod 26, a condenser lens 27, a stop 28, and a relay lens 29 to impinge in a prism 30, and a mirror 31 in the prism 30 reflects the color light beam 25 to a light valve 10, such as Digital Micro-mirror Device (hereinafter referred to as "DMD"). Therefore, the light valve 10 modulates the color light beam 25 to generate an image light and reflects the image light into a projection lens 32 for projecting an image onto a screen (not shown).

The DMD has an array of inclinable mirrors corresponding to an array of pixels constituting the image. When one of inclinable mirrors reflects a light beam to the screen, the inclinable mirrors is referred to as "on-state"; when reflecting a light beam off the screen, the pixel mirror is referred to as "off-state"; when the pixel mirror parallel the DMD board, that is between the on-state and the off-state, the pixel mirror is referred to as "flat-state".

Figure 2:
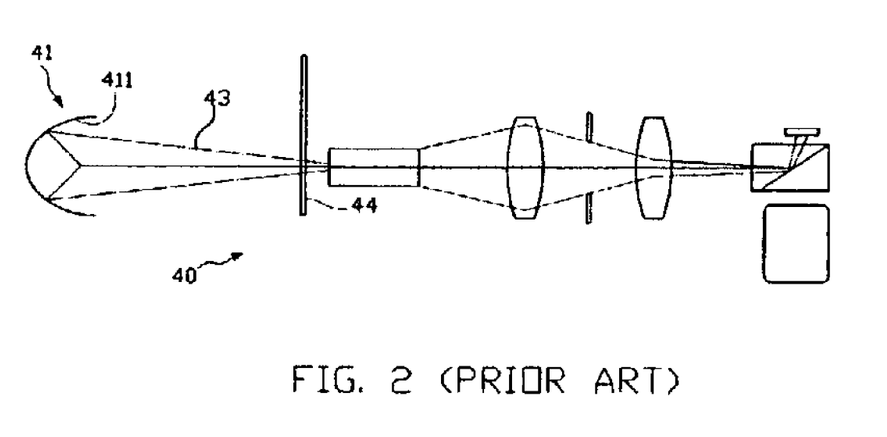
FIG. 2 is a schematic view showing a light path of a second projection system in the prior art.

FIG. 2 shows a second projection system 40 in a prior art. The difference, between the first projection system 20 and the second projection system 40, is that the light source 41 of the second projection system 40 has an elliptic concave reflector 411. The elliptic concave reflector 411 reflects and converges a light beam, emitted from the light source 41, to a color wheel 44 without passing a converging lens. For the rest, the second projection system 40 is the same as the first projection system 20 and actually is one embodiment of the first projection system 20. To simplify the description, the first projection system 20 was only described as an example in the following specification, buts its technologies can be fully suitable for the second projection system 40.

Figure 3:
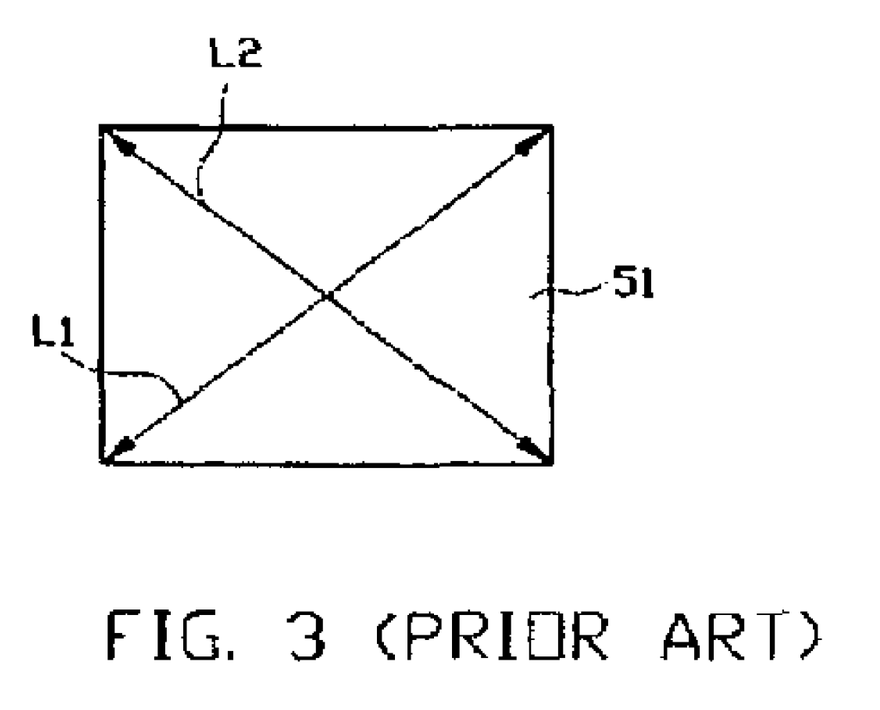
FIG. 3 is a schematic cross-sectional view showing a non-distortion rectangular light beam of a first projection system in the prior art before the light beam obliquely impinges onto the light valve.

In the first projection system 20, from the light source 21 to the light valve 10, the light beam passes through any optical element, such as the converging lens 22, the color wheel 24, integration rod 26, the condenser lens 27, the stop 28, and the relay lens 29, having the geometrically symmetric feature. Therefore, as shown in FIG. 3, before obliquely impinging onto the light valve 10, the light beam has a rectangular cross section to form a rectangular-sectional light beam 51 with a feature of an intensely uniform illumination. If any above-mentioned optical elements and their assembly are perfect, the length of a first diagonal L1 will be equal to that of a second diagonal L2 on the rectangular-sectional light beam 51, i.e. the rectangular-sectional light beam 51 has no distortion.

Figure 4:
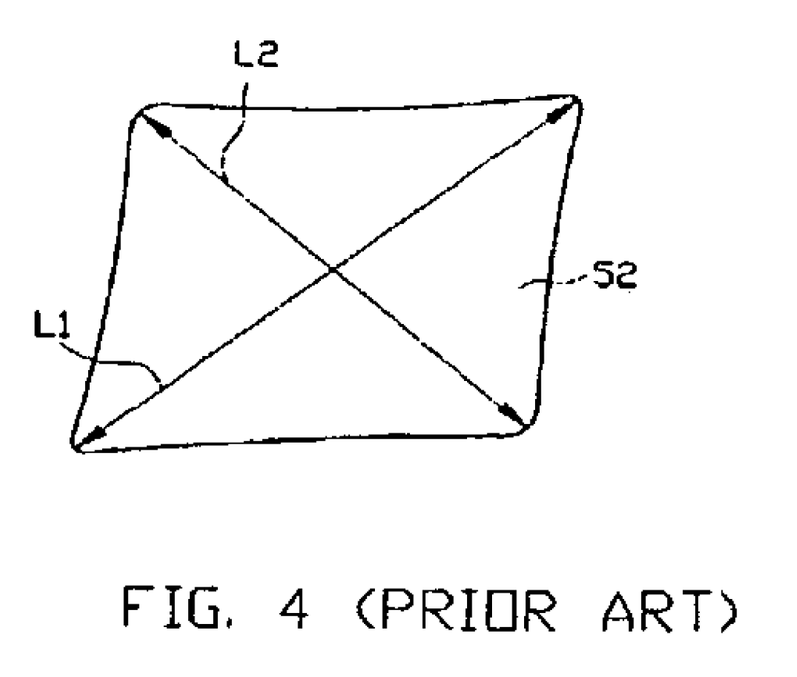
FIG. 4 is a schematic view showing a distorted rectangular light spot on the light valve in the prior art.

Referring to FIG. 4, when the rectangular-sectional light beam 51, passing through the prism 30, obliquely impinges onto the light valve 10, a light spot 52 is formed thereon. Consequently, the light spot 52 is distorted due to the inclined incidence, so that the length of the first diagonal L1 isn't equal to that of the second diagonal L2, i.e. L1>L2.

The above-mentioned prior art has at least two drawbacks as follows: one reduces the uniform brightness of the light spot resulted from the unequal extension of two diagonals; the other causes the brightness loss on circumference of the light spot from the extension of the first diagonal L1 out of the light valve and results in decreasing the illumination efficiency.

SUMMARY OF THE INVENTION

One objective of the present invention is to provide a method for offsetting two asymmetric diagonals of the distorted light spot. By the use of an anamorphic surface unit of a projection system, the method will improves the asymmetric light spot resulted from the inclined incidence to achieve a more symmetric light spot.

The other objective of the present invention is to use an anamorphic surface unit for producing two asymmetric orthogonal axes so that an illuminating system can generate a parabolic-sectional light beam with a smaller F-number. Thus, that can avoid the overlap of light beams between on-state and flat-state to raise the contrast. Furthermore, by amplifying the light spot, the projection system will increase the total illumination efficiency of the optic system.

DETAILED DESCRIPTION OF PREFERRED EMBODIMENTS

Referring to the drawings, the present invention will be described in a following embodiment. For solving a distortion of the prior art, the present invention is to provide an anamorphic surface unit for offsetting the distortion formed by two asymmetric diagonals of a light spot, so that the asymmetric light spot, resulting from inclined incidence of a projection system, can be improved into a more symmetric light spot.

Figure 11:
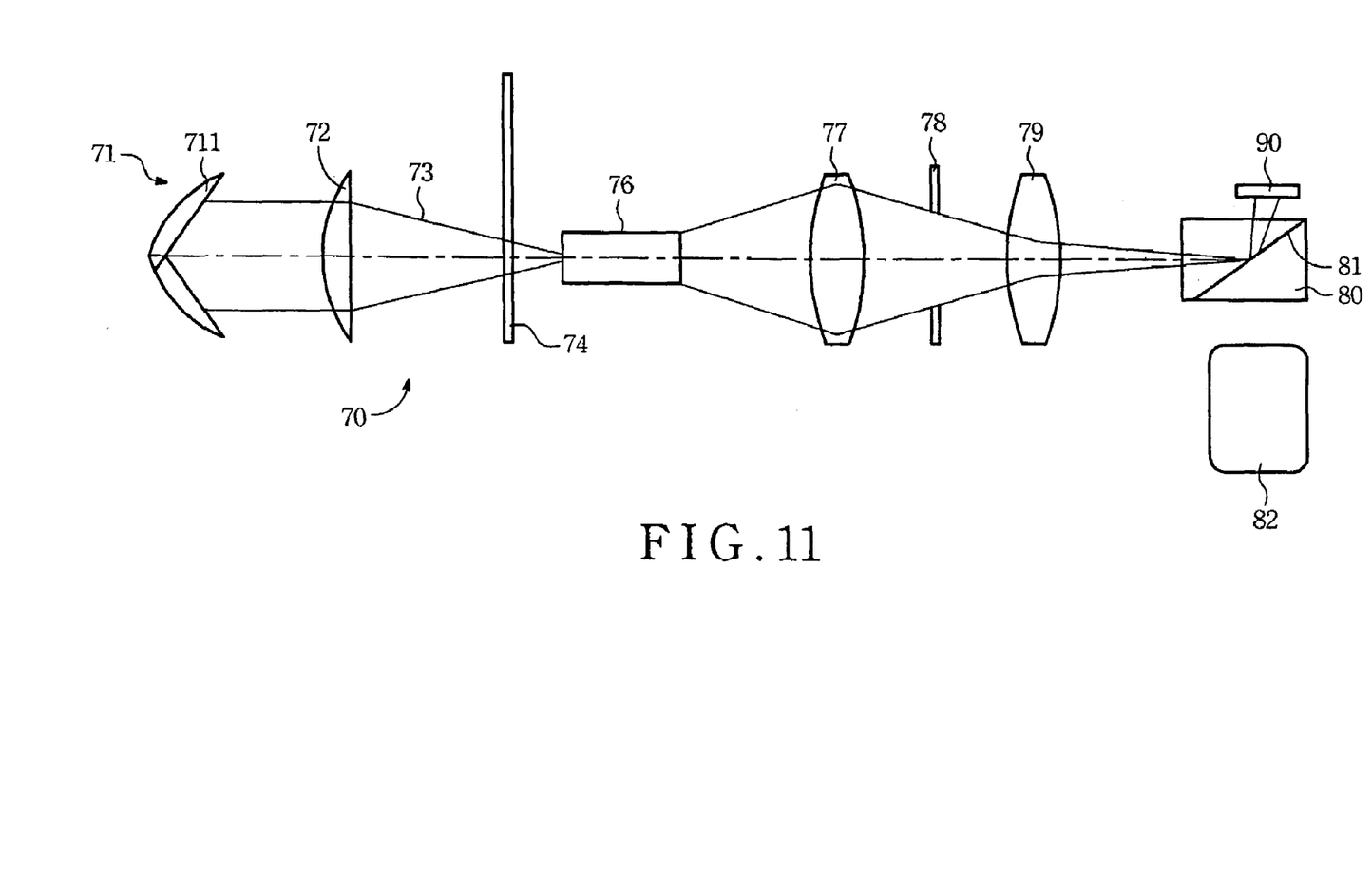
FIG. 11 is a schematic view showing a light path of a system for improving asymmetric projection according to the present invention.

Referring to FIG. 11, an embodiment of the invention has almost the same projection system and light path as the first projection system 70 of the prior art, but there is a difference in the relay lens 79. That is, the embodiment of the invention, the system for improving asymmetric projection 70, includes the light source 71 producing a light beam 73 to form a light path. The light beam 73 successively passes through the reflector 711, the converging lens 72, the color wheel 74, integration rod 76, the condenser lens 77, the stop 78, the relay lens 79, the prism 80, and the mirror 81. Then, the light beam 73 obliquely impinges to the light valve 90 and finally reflects to the projection lens 82 to project an image onto the screen. The difference, between the embodiment of the invention and the first projection system 20, is that the embodiment of the invention has an anamorphic surface unit placed in the light path between the light source 21 and the light valve 10. In general, the anamorphic surface unit may be formed on one surface of a lens, reflector, or mirror. Concretely, the anamorphic surface unit may be formed on any surface of the reflector 711, converging lens 72, condenser lens 77, relay lens 79, or mirror 81.

Figure 5A:
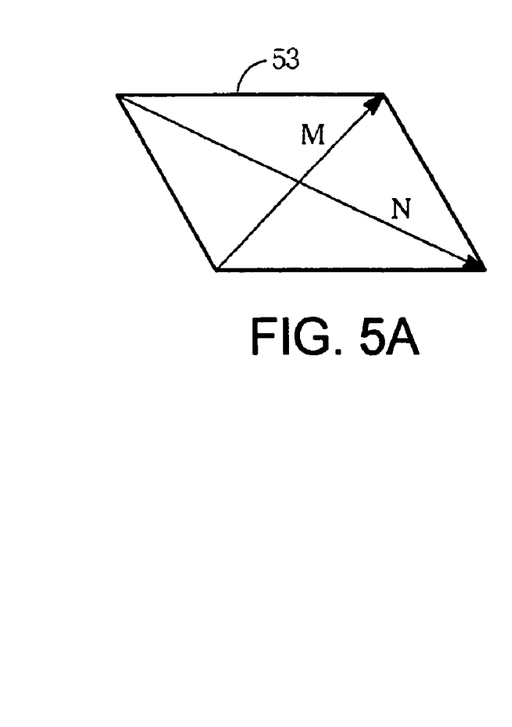
FIGS. 5(A)-5(C) is a schematic view showing an improving procedure by the use of an anamorphic surface unit.
Figure 5B:
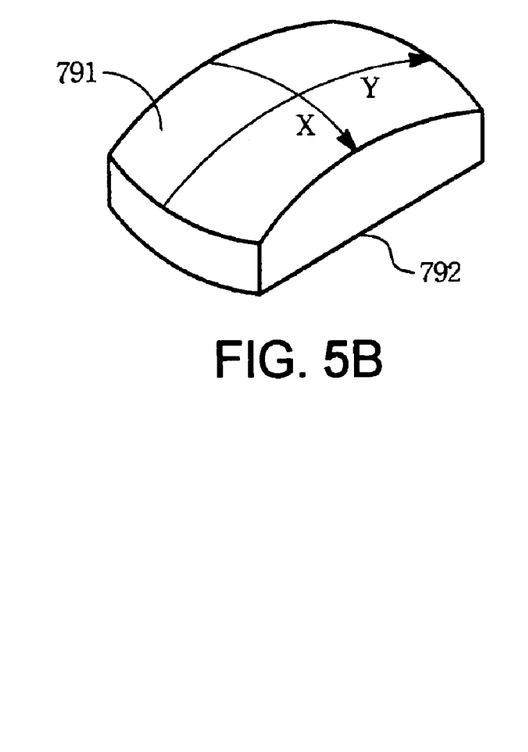
Figure 5C:
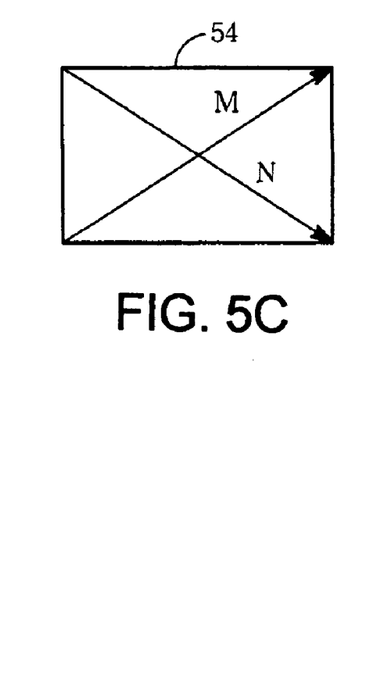

Referring to FIGS. 5(A)-5(C), The anamorphic surface unit 791 is formed on one surface of the relay lens 79 in this embodiment, for example. Referring to FIGS. 5(A)-5(C), FIG. 5(B) shows the relay lens 79 as a rectangular anamorphic lens, which has one normal surface 792 and another convex surface 791 with larger curvature at X-axis than Y-axis. FIG. 5(A) shows the distorted light spot 53 on DMD, which is one embodiment of the light valve 90 in present invention, in which two diagonals at M and N direction in asymmetric each other, and the length of the N-direction diagonal is longer than that of the M-direction diagonal. When using the anamorphic lens 791 replaces relay lens 79, the X-axis of the anamorphic lens 791 is in the N-direction of the distorted light spot, and the Y-axis is in the -direction. Therefore, by means of a different amplifying rates due to the different curvature of the X-axis and the Y-axis, the length of the N-direction diagonal can be shortened to improve the asymmetric light spot on DMD 90 for achieving a more symmetric light spot 54, shown in FIG. 5(C). In the same principle, by the use of the anamorphic surface unit 791 with the different curvature, the light spot 54 can appropriately be symmetrized or produced a predetermined distortion.

Figure 6A:
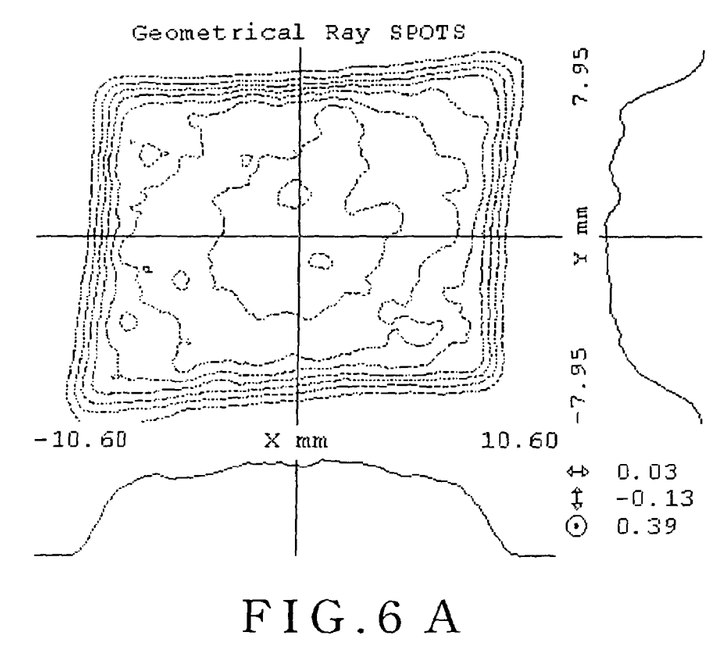
FIGS. 6(A)-6(B) is a spot diagram respectively showing a brightness distribution of the light spot of the prior art and the present invention on DMD.
Figure 6B:
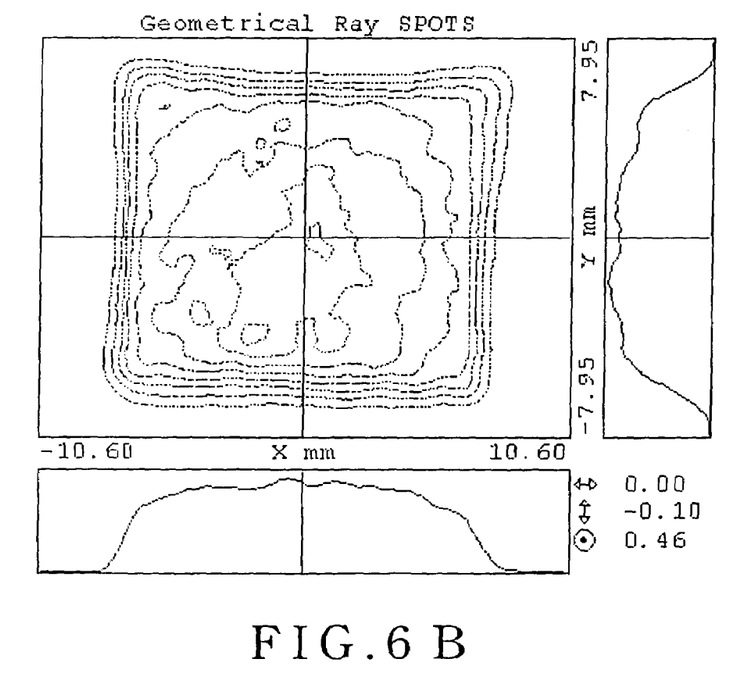

Referring to FIG. 6, FIG. 6(A) shows a DMD spot diagram of the prior art without an anamorphic surface unit. Due to the inclined incidence, the light spot of the prior art generates a distortion and appears a diagonal extension from the down-left to up-right corner. That is, the length of the first diagonal L1 is longer than that of the second diagonal L2, shown in FIG. 4. On the contrary, FIG. 6(B) shows a DMD spot diagram of the present invention with an anamorphic surface unit. By using an anamorphic surface unit to offset the distortion resulting from inclined incidence, a more symmetric light spot can be achieved. In contrast with the asymmetric light spot, the extension on the diagonal of the DMD light spot, shown in FIG. 6(B), have been improved obviously.

Furthermore, because the light beam on DMD can only be reflected to the screen through the rear-end projection lens, an available rectangular region need to be defined for matching the DMD within the light spot shown in FIGS. 6(A) and 6(B). Owing to the producing tolerance, the available rectangular region is slightly larger than the DMD and has the same ratio of length and width as that of the DMD in order to make sure that the light beam can illuminate all DMD. Therefore, the illuminating loss area, between the peripheries of the available rectangular and the asymmetric DMD light spot in the prior art, is larger than that of the present invention, so the total light collection efficiency of the prior art is less than that of the present invention.

Figure 7:
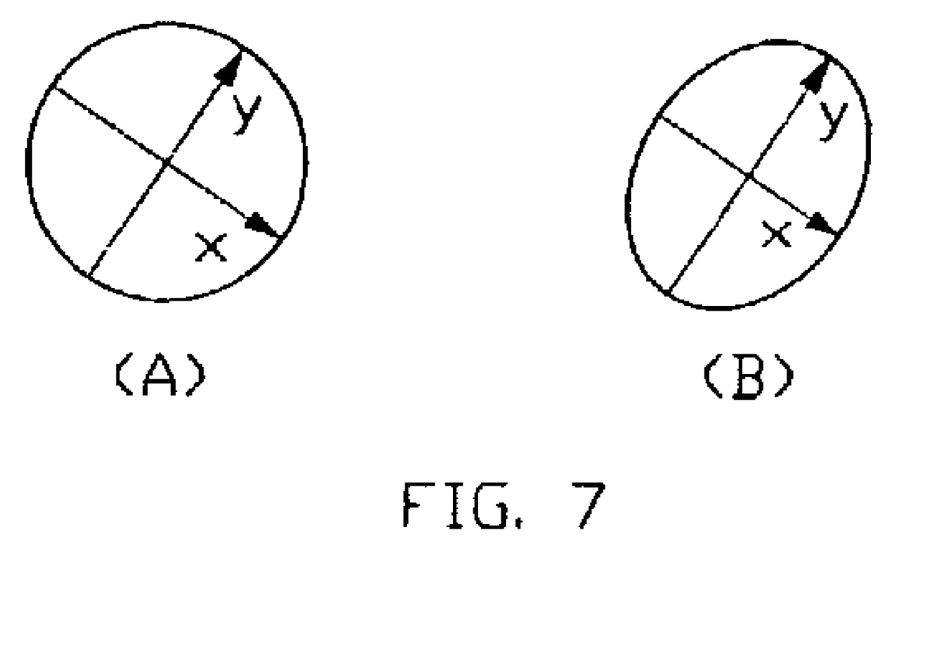
FIGS. 7(A)-7(B) is a schematic view showing the axial-extended elliptic light spot on the stop.

Referring to FIGS. 7(A) and 7(B), FIG. 7(A) shows that the light spot on the stop of projection lens 32 is a circle spot due to the relay lens 29 without an anamorphic surface unit in prior art. FIG. 7(B) shows the light spot on the stop of projection lens 82 due to the relay lens 79 with an anamorphic surface unit 791. Because the relay lens 79 has the anamorphic surface 791 with the different curvatures in X-axis and Y-axis to produce different amplifications, the light spot extends different lengths along the X-axis and Y-axis and forms an elliptic spot. Therefore, the Y-axis length of the light spot on the stop of projection lens 82 is elongated clearly, so that the shape of the light spot transforms a circular into an ellipse to increase the total light collection efficiency of projection system. The technology of the present invention will be described in detail as follows.

Figure 8:
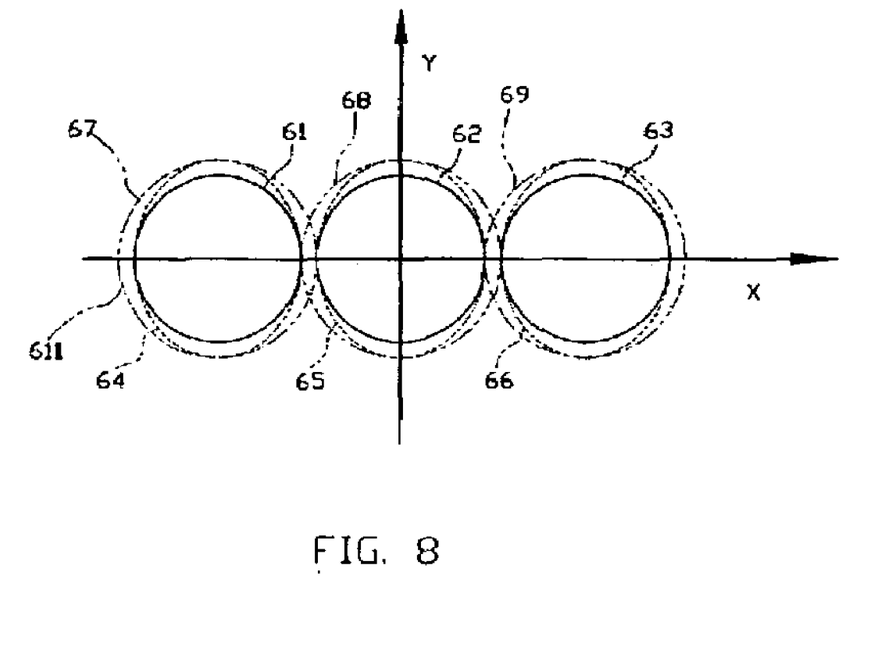
FIG. 8 is a schematic view showing the relative positions of the open-state, off-state, and flat state of the light beam on the spot of the projection lens.
Figure 12:
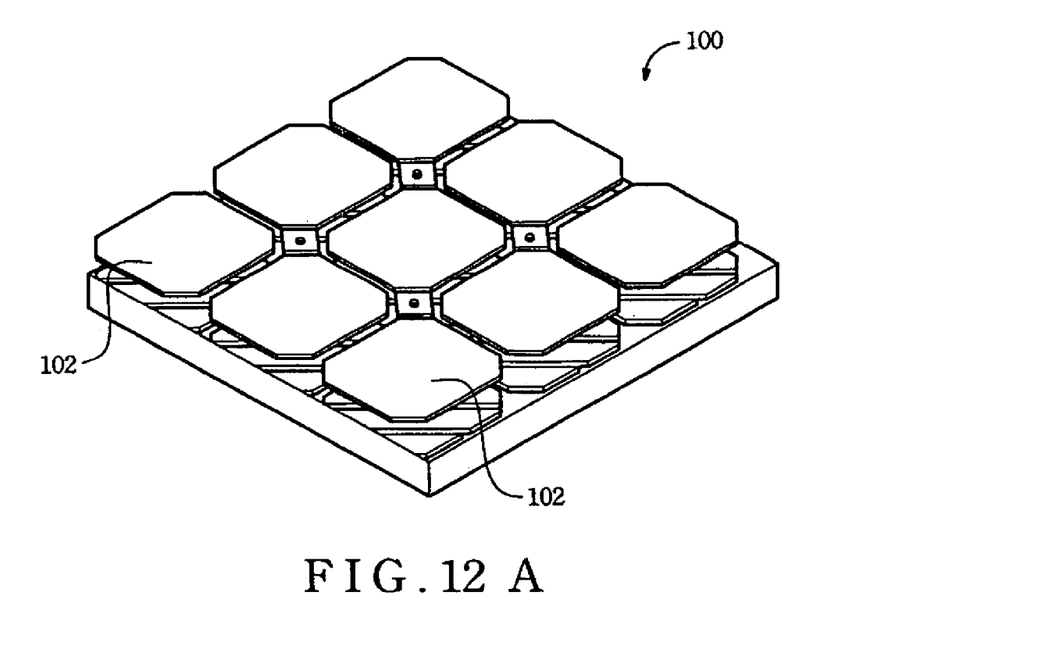
FIG. 12A is a schematic view showing the Digital Micro-mirror Device (DMD) with the array of inclinable mirrors.
FIG. 12B is a schematic cross-sectional view showing the inclinable mirror can be operated at on-state, off-state and flat-state.

FIG. 8 shows the relative positions of the on-state, off-state, and flat state of the light beam at the stop of the projection lens 82. Please refer to FIG. 12A, the Digital Micro-mirror Device (DMD) 100 has the array of inclinable mirrors 102, and each mirror 102, as shown in FIG. 12B, can be operated at on-state 104a, off-state 104b, or flat-state 104c, to reflect the incident light beam 73 for generating the on-state light beam 61, the flat-state light beam 62, or the off-state light beam 63. The solid line respectively represents the on-state light beam 61, flat state light beam 62, and off-state light beam 63 of the prior art, and the dotted line respectively represents the on-state light beam 64, flat-state light beam 65, and off-state light beam 66 of the present invention. In theory, the bigger the on-state light beam 61 is, the more light flux can be allowed to enter into the stop for achieving better brightness. If the on-state light beam 61 is enlarged to produce a light spot 611 having the same size as the stop 67, the flat-state light beam 62 and off-state light beam 63 will also be enlarged as light spot 68 and 69 respectively. That causes the some overlaps between light spot 611 and light spot 68 to decrease the projection contrast. Therefore, the on-state light beam 61, flat state light beam 62, and off-state light beam 63 of the prior art are set to be next to each other and have no X-axial overlap between them, so that the maximum light flux can be allowed to pass without the sacrifice of contrast to achieve the best balance.

The present invention uses an anamorphic surface unit for producing two asymmetric orthogonal axes to offset the distorted light spot formed by the inclined incidence of the prior art, so as to achieve a more symmetric light spot. Meanwhile, the present invention may also use the feature of two asymmetric orthogonal axes to extend the light spot of the on-state light beam 64, flat-state light beam 65, and off-state light beam 66 along Y-axis. Then, the diaphragm of the present invention is enlarged (i.e. the F number decreases). The on-state light beam 64, flat state light beam 65, and off-state light beam 66 of the present invention can respectively replace the on-state light beam 61, flat state light beam 62, and off-state light beam 63 of the prior art. Thus, the present invention can make sure that the elliptic light beam with the larger maximum light flux pass without any loss, and avoid the overlaps between the on-state light beam 64, flat-state light beam 65, and off-state light beam 66.

Figure 9:
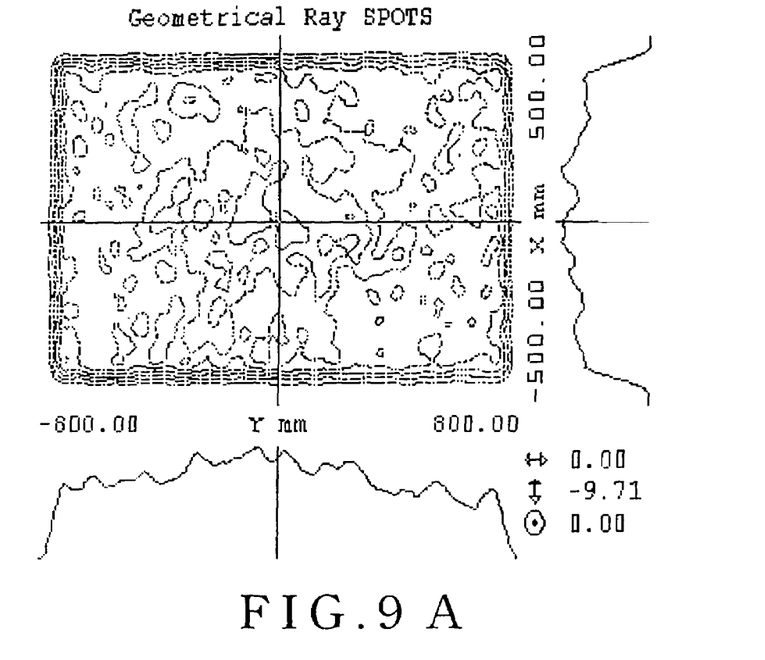
FIGS. 9(A)-9(B) is a spot diagram respectively showing the brightness distribution of the screen of the prior art and the present invention.

FIG. 9(A) and FIG. 9(B) respectively show the screen brightness distribution diagrams of the prior art and the present invention when the light beam on the DMD reflects onto the screen through the rear-end projection lens. As a result, the deep color, showing in FIG. 9(B), representing the high brightness distribution region of the present invention is larger than that of the prior art, as shown in FIG. 9(A), in the brightness region and uniformity of the screen diagram. Furthermore, the X-axis and Y-axis brightness distribution of the present invention is also indeed more uniform that that of the prior art in the screen diagram.

Figure 10:
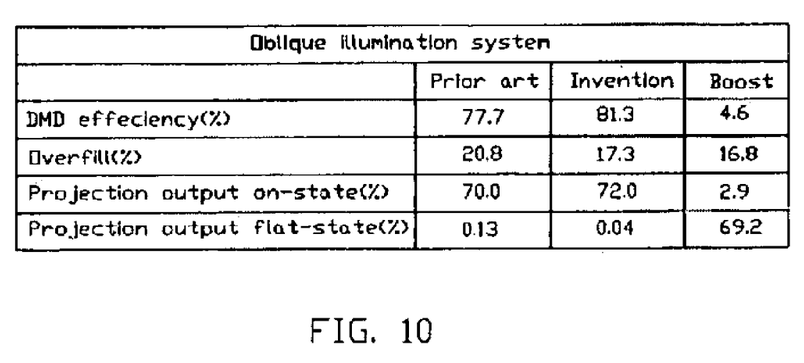
FIG. 10 is an experimental data list showing the contrast between the present invention and the prior art.

Referring to FIG. 10, the experimental data list shows the contrast between the present invention and the prior art. The experimental datum includes the percentages of DMD efficiency DMD, overfill, the projection output efficiency of on-state, and the projection output efficiency of flat-state. The right columns of the list show the improving rate of the present invention compared with that of the prior art. As to the improving rates of the present invention, the DMD efficiency is 4.6%; the overfill loss is 16.8%; the projection output efficiency of on-state is 2.9%; the projection output efficiency of flat-state is 69.2%.

Although the reflective DMD is a example for describing the above preferred embodiments, it can be replaced with a Liquid Crystal On Silicon (LCOS) or a Liquid Crystal Display (LCD) panel.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A system for improving asymmetric projection comprising:
    a light source producing a light beam to form a light path;
    a projection lens which is disposed in the light path and projects an image;
    a light valve inserted in the light path between the light source and the projection lens, which receives the light beam obliquely impinging from the light source to form a light spot, selects and reflects the light spot to the projection lens or predetermined directions; and
    at least one anamorphic surface unit placed in the light path between the light source and the light valve, and having different curvatures on one surface to offset the distortion of the light spot resulting from obliquely impinging.

2. The system for improving asymmetric projection of claim 1, wherein the light valve is a Digital Micro-mirror Device (DMD) having an array of inclinable mirrors operated in a state selected from a group consisting of on-state, off-state, and flat-state.

3. The system for improving asymmetric projection of claim 2, wherein the anamorphic surface unit has a curvature in predeterminate axis for elongating the Y-axial length of the light spot in on-state, flat-state, and off-state in order to form non-overlapping elliptic light beams.

4. The system for improving asymmetric projection of claim 3, wherein the light valve is a Digital Micro-mirror Device (DMD) having an array of inclination mirrors operated in a state selected from a group consisting of on-state, off-state, and flat-state.

5. The system for improving asymmetric projection of claim 3, wherein the anamorphic surface unit is an anamorphic lens.

6. The system for improving asymmetric projection of claim 1, wherein the anamorphic surface unit is an anamorphic lens.

7. The system for improving asymmetric projection of claim 1, further comprising a reflector, a converging lens, a color wheel, an integration rod, a condenser lens, a relay lens, and a mirror located between the light source and the light valve,
    wherein the anamorphic surface unit is selected from a group consisting of any one surface of the reflector, the converging lens, the condenser lens, the relay lens, and the mirror,
    wherein the light path traveling sequentially through the reflector, the converging lens, the color wheel, the integration rod, and the condenser lens before passing through the relay lens.

8. A system for improving asymmetric projection comprising:
    a light source producing a light beam to form a light path;
    a projection lens which is disposed in the light path and projects an image;
    a light valve inserted in the light path between the light source and the projection lens, which receives the light beam obliquely impinging from the light source to form a light spot, selects and reflects the light spot to the projection lens or predetermined directions; and
    at least one anamorphic surface unit placed in the light path between the light source and the light valve, which transmits the light spot and has different curvatures on one surface to offset the distortion of the light spot resulting from obliquely impinging.

9. The system for improving asymmetric projection of claim 8, wherein the asymmetrically curved anamorphic surface unit has a curvature in predeterminate axis for elongating the Y-axial length of the light spot in on-state, flat-state, and off-state in order to form non-overlapping elliptical light beams.

10. The system for improving asymmetric projection of claim 9, wherein the light valve is a Digital Micro-mirror Device (DMD) having an array of inclinable mirrors operated in a state selected from a group consisting of on-state, off-state, and flat-state.

11. The system for improving asymmetric projection of claim 10, wherein the anamorphic surface unit has a curvature in predeterminate axis for elongating the Y-axial length of the light spot in on-state, flat-state, and off-state in order to form non-overlapping elliptic light beams.

12. The system for improving asymmetric projection of claim 9, wherein the anamorphic surface unit is an anamorphic lens.

13. The system for improving asymmetric projection of claim 8, further comprising a reflector, a converging lens, a color wheel, an integration rod, a condenser lens, a relay lens, and a mirror located between the light source and the light valve, wherein the anamorphic surface unit is selected from a group consisting of any one surface of the reflector, the converging lens, the condenser lens, the relay lens, and the mirror, wherein the light path traveling sequentially through the reflector, the converging lens, the color wheel, the integration rod, and the condenser lens before passing through the relay lens.

14. A system for improving asymmetric projection comprising:

a light source producing a light beam to form a light path;

at least one anamorphic surface unit placed in the light path after the light source, which transmits the light beam and has different curvatures on one surface to offset the distortion of the light beam;

a light valve inserted in the light path after the anamorphic surface unit, which receives the light beam obliquely impinging from the light source to form a light spot, selects and reflects the light spot to the projection lens or predetermined directions; and a projection lens which is disposed in the light path after the light valve for receiving the light spot to project an image.

15. The system for improving asymmetric projection of claim 14, further comprising a reflector, a converging lens, a color wheel, an integration rod, a condenser lens, a relay lens, and a mirror located between the light source and the light valve, wherein the anamorphic surface unit is selected from a group consisting of any one surface of the reflector, the converging lens, the condenser lens, the relay lens, and the mirror, wherein the light path traveling sequentially through the reflector, the converging lens, the color wheel, the integration rod, and the condenser lens before passing through the relay lens.

* * * * *